United States Patent [19]

Hoppe et al.

[11] 4,393,179

[45] Jul. 12, 1983

[54] SYNTHETIC RESIN

[75] Inventors: Karl Hoppe; Udo Strauss, both of Münster, Fed. Rep. of Germany

[73] Assignee: BASF Farben & Fasern A.G., Hamburg, Fed. Rep. of Germany

[21] Appl. No.: 324,109

[22] Filed: Nov. 23, 1981

[30] Foreign Application Priority Data

Dec. 1, 1980 [DE] Fed. Rep. of Germany ....... 3045251

[51] Int. Cl.$^3$ ..................... C08L 63/00; C08L 61/34
[52] U.S. Cl. ............................. 525/490; 204/181 C; 525/481; 525/486
[58] Field of Search ...................... 525/481, 486, 490

[56] References Cited

U.S. PATENT DOCUMENTS

| 3,994,989 | 11/1976 | Kempter | 525/490 |
| 4,001,155 | 1/1977 | Kempter | 525/490 |
| 4,086,292 | 4/1978 | Kempter | 525/484 |
| 4,134,932 | 1/1979 | Kempter | 525/481 |

FOREIGN PATENT DOCUMENTS 2751499 5/1979 Fed. Rep. of Germany ...... 525/481

Primary Examiner—Paul Lieberman
Attorney, Agent, or Firm—Wells & Wells

[57] ABSTRACT

A synthetic resin is in the form of a metal complex compound. The resin is the reaction product of:
(a) Mannich bases which are free from epoxide groups; with
(b) epoxide resins;
wherein aliphatic hydroxyl groups originating from (a), (b), or a mixture thereof, are at least partially converted into urethane groups by reaction with partially blocked isocyanate, said Mannich bases (a) formed from components selected from:
($a_1$) condensed phenols which are free from ether groups and contain at least two aromatic rings and at least two phenolic hydroxyl groups;
($a_2$) condensed phenols which contain ether groups and contain at least two aromatic rings and at least two phenolic hydroxyl groups;
($a_5$) formaldehyde or compounds which split off formaldehyde;
($a_3$) secondary amines having at least one hydroxyalkyl group; and
($a_4$) dialkylamines or dialkoxyalkylamines which do not contain free hydroxyl groups; or from the components:
($a_1$) and ($a_2$) with ($a_5$) and ($a_3$);
($a_1$) with ($a_5$) and ($a_3$);
($a_2$) with ($a_5$) and ($a_3$);
($a_1$) with ($a_5$), ($a_3$), and ($a_4$); or
($a_2$) with ($a_5$), ($a_3$), and ($a_4$); and copper bound with the reaction product to form the metal complex compound.

21 Claims, No Drawings

SYNTHETIC RESIN

The invention relates to a synthetic resin in the form of a metal complex compound. It is suitable as a film-forming component in an electrocoating bath for the production of coatings on electrically conductive substrates which are connected as the cathode in an electrocoating lacquering process.

The deposition of synthetic resins by means of cataphoresis is known. Products from the reaction of Mannich bases which are free of epoxide groups with epoxide resins are suitable, in a protonated form, for this purpose. (See German Published Specification No. 2,751,499.) They are the film-forming component in electrocoating lacquers and give, after stoving, coatings having good corrosion protection. However, as a rule iron surfaces require a pretreatment by phosphatizing them with zinc phosphate, zinc calcium phosphate or iron phosphate, in order to impart a sufficient degree of corrosion protection to the surface to be coated and to provide a sufficiently firm adhesion for the coating deposited. Because of the complicated control of the various phosphatizing processes, such a pretreatment is susceptible to disruption and associated with considerable fluctuations in respect of maintaining the film weight and the structure of the phosphatized film.

The object of the present invention was to eliminate the disadvantages which normally occur during the customary pretreatment and, if appropriate, to dispense altogether with the pretreatment by phosphatizing, without lowering the corrosion protection effect of the electrocoating lacquer.

It has now been found that the abovementioned disadvantages can be avoided by means of a synthetic resin in the form of a metal complex compound, which resin comprises a product from the reaction of (a) Mannich bases which are free from epoxide groups and are formed from ($a_1$) condensed phenols which are free from ether groups and contain at least two aromatic rings and at least two phenolic hydroxyl groups, and/or ($a_2$) condensed phenols which contain ether groups and contain at least two aromatic rings and at least one phenolic hydroxyl group, ($a_3$) secondary amines having at least one hydroxyalkyl group, if appropriate mixed with ($a_4$) secondary dialkylamines or dialkoxyalkylamines which do not contain free hydroxyl groups, and ($a_5$) formaldehyde or compounds which split off formaldehyde, with (b) epoxide resins, aliphatic hydroxyl groups originating from (a) and/or (b) being optionally converted, at least partially, into urethane groups by reaction with partially blocked isocyanates, in which reaction product metals are complex-bonded.

Those reaction products in which copper is complex-bonded are preferentially suitable. The best results are obtained if 0.5 to 0.6 part by weight of copper is complex-bonded per 1,000 parts by weight of the reaction product.

Another preferred embodiment provides that the reaction product which contains complex-bonded copper is protonated by acids.

In a further embodiment, the absorption band is between 350 and 500 nm.

The invention also relates to a process for preparing the synthetic resin, which comprises allowing a metal salt solution, in particular a copper salt solution, to react with a solution of the reaction product in organic solvents and/or water.

The invention also relates to the use of the synthetic resin according to the invention for the production of coatings on the surface of electrically conductive substrates, connected as the cathode, by cathodic deposition from a coating bath in a cathodic electrocoating lacquering process and subsequent stoving of the coating.

The synthetic resins according to the invention can be cathodically deposited evenly at a pH value between 7 and at most 9 and they produce, after a brief coating time, coatings which, after stoving, have outstanding mechanical properties, such as high hardness and scratch resistance together with good elasticity and firm adhesion to the substrate. The corrosion protection afforded to ferrous metal substrates is extraordinarily high. In many cases, a conventional phosphatizing step and the sources of defects associated with it can be omitted. Even spot-welding seams, which customarily do not accept any phosphatizing solution, are provided with perfectly adhesive and corrosion-proof coatings by the synthetic resins according to the invention.

It has also been found that the formation of a metal complex stabilizes the relatively labile groups of the reaction product, specifically the diethanolaminomethylene grouping, which extends the shelf life of a solution of the resin in organic solvents and/or water. The groups via which crosslinking occurs during stoving are fixed and pre-oriented.

The metal complex also effects a preferential orientation of the crosslinking groups to the metal surface, during the deposition process, since the copper of the metal complex is deposited on the cathode together with the complex. This produces on the cathode a finer-grained and denser coating, the surface of which is so smooth after stoving at temperatures up to 200° C., for a stoving time of about 15 minutes, that a single top layer of lacquer is sufficient to achieve a lacquer coating with a good appearance.

The reaction product formed from Mannich bases which are free from epoxide groups, and epoxide resins is present in a protonated form in the electrocoating bath. This product is protonated by means of suitable inorganic and/or organic acids, preferably water-soluble carboxylic acids, and, in the protonated form, it is soluble or dispersible in water or can be mixed and diluted with water. The pH value of the aqueous solution or aqueous dispersion is adjusted to a value between 7 and not more than 9.

Suitable acids are virtually all known inorganic and organic acids, such as, for example, hydrochloric acid, sulfuric acid, phosphoric acid, carbonic acid, p-toluenesulfonic acid, acetic acid, propionic acid, formic acid, citric acid, lactic acid, malic acid, fumaric acid, maleic acid and phthalic acid and also the half-esters of fumaric acid, maleic acid and phthalic acid with monohydric or polyhydric aliphatic alcohols, such as methanol, ethanol, propanol or ethylene glycol.

The best results are obtained using acetic acid, lactic acid and formic acid, which are therefore proposed as preferentially suitable protonating agents.

The synthetic resin according to the invention is preferably used in coating agents for the cathodic electrocoating lacquering of electrically conducting substrates, for example metal parts made of aluminum, brass, copper, iron, steel and iron alloys containing other metals, which may be chemically pretreated, for example phosphatized.

In order to characterize the synthetic resin according to the invention unambiguously, however, the following should be stated in regard to the individual components:

The Mannich bases (a) which are free from epoxide groups are prepared from ($a_1$) condensed phenols which are free from ether groups and contain at least two aromatic rings and at least two phenolic hydroxyl groups, and/or ($a_2$) condensed phenols which contain ether groups and contain at least two aromatic rings and at least one phenolic hydroxyl group, ($a_3$) secondary amines having at least one hydroxyalkyl group, if appropriate mixed with ($a_4$) secondary dialkylamines or dialkoxyalkylamines which do not contain free hydroxyl groups, and ($a_5$) formaldehyde or compounds which split off formaldehyde.

Condensed phenols which are free from ether groups and contain at least two aromatic rings and at least two phenolic hydroxyl groups ($a_1$) which are particularly suitable are condensed phenols of the general formula

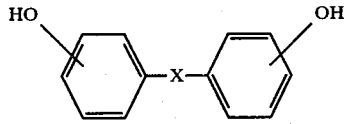

wherein the hydroxyl groups are in the ortho-position or para-position in relation to X and X is a straight-chain or branched, divalent aliphatic radical having 1 to 3 carbon atoms, or $SO_2$, $SO$ or

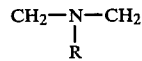

(in which R=alkyl radical having 1 to 6 C atoms); bisphenol A is preferentially suitable. Low-molecular reaction products formed from phenols and formaldehyde, so-called novolacs, can also be employed.

If appropriate, it is possible to use, as a mixture with the condensed phenols ($a_1$) or instead of the latter, further condensed phenols ($a_2$) which contain at least one phenolic hydroxyl group and, in addition, also one or more ether groups in the molecule.

These products have the general formula

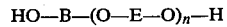

or

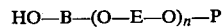

wherein B represents the radical

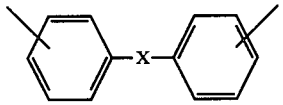

and X has the meaning indicated above, E represents a radical which contains hydroxyl groups and has been obtained by adding an epoxide compound onto a phenolic hydroxyl group, P represents a phenyl or alkylphenyl radical and n represents an integer from 1 to 3, and wherein epoxide resins such as, for example, diglycidyl ethers of bisphenol A, pentaerythritol, glycerol, trimethylolpropane, glycol, glycol ethers, and other polyhydric, preferably dihydric to tetrahydric alcohols are preferably employed as the epoxide compounds (for E).

If the condensed phenols ($a_2$) are to be used on their own, it is appropriate to select those based on triglycidyl or tetraglycidyl ethers.

Other suitable compounds containing epoxide groups are nitrogen-containing diepoxides, such as are described in U.S. Pat. No. 3,365,471, epoxide resins obtained from 1,1-methylene-bis-(5-substituted hydantoin) in accordance with U.S. Pat. No. 3,391,097, diepoxides obtained from bisimides in accordance with U.S. Pat. No. 3,450,711, epoxylated aminomethyldiphenyl oxides according to U.S. Pat. No. 3,312,664, heterocyclic N,N'-diglycidyl compounds according to U.S. Pat. No. 3,503,979, aminoepoxy phosphates according to British Pat. No. 1,172,916 or 1,3,5-triglycidyl isocyanurates.

Components ($a_2$) which are particularly preferred are the products formed from the reaction of diglycidyl ethers or bisphenol A or of polyhydric aliphatic alcohols, such as pentaerythritol, trimethylolpropane and glycerol, with bisphenol A and, if appropriate, phenol, which contain phenol groups and are virtually free from epoxide groups. Such products generally have molecular weights from 650 to 1,300 and epoxide values from 0.004 to 0.01 and can be prepared, for example, at temperatures between 160° and 180° C., or at correspondingly lower temperatures in the presence of catalysts for the reaction.

The condensed phenols ($a_2$) contain aliphatically linked hydroxyl groups. Some of these are formed from the epoxide groups at the epoxide resins (E) in the reaction of the latter with the bisphenols (B) or with the phenols (P). However, hydroxyl groups can also be present even in the epoxide resins themselves, if the latter have been prepared by reacting alcohols of a functionality higher than dihydric (for example pentaerythritol, trimethylolpropane or glycerol) with 2 moles of epichlorohydrin.

In the case which is in itself preferred, in which mixtures of the components ($a_1$) and ($a_2$) are employed, the ratio by weight of the two components is between 1:0.1 and 1:5.

Examples of suitable secondary amines ($a_3$) which contain at least one hydroxyalkyl group are alkylethanolamines or alkylisopropanolamines having 1 to 6 carbon atoms in the alkyl group.

Dialkanolamines of alcohols having 2 to 6 carbon atoms, in particular diethanolamine, and also mixtures of these dialkanolamines with alkylalkanolamines are preferred, however.

The secondary amines ($a_3$) which are incorporated in the Mannich bases (a) as dialkanolaminomethyl groups and alkylalkanolaminomethyl groups are of considerable importance for the degree of dispersibility of the binders in the desired pH range of 6.0 to 10.2 and for the crosslinking of the system.

Suitable secondary dialkylamines or dialkoxyalkylamines ($a_4$) which are employed conjointly with the amines ($a_3$) containing hydroxyalkyl groups for the preparation of the Mannich bases are those of the general formula

in which $R_1$ and $R_2$ are identical or different and represent a straight-chain or branched aliphatic radical which has 2 to 10 carbon atoms and can contain alkoxy groups. Examples of suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, such as, for example, di-2-methoxyethylamine, di-2-ethoxyethylamine or di-2-butoxyethylamine, and also secondary amines in which $R_1$ and $R_2$ are linked to form a ring, such as, for example, morpholine or piperidine.

Di-n-butylamine, di-2-ethylhexylamine and di-n-hexylamine are preferentially suitable. The mode of action of these secondary amines ($a_4$) consists chiefly in influencing the stability properties of the binders, and, in addition, they contribute to the leveling and to the "internal plasticization" of the lacquer films produced from the binders. They also make a certain contribution to the crosslinking.

As a result of their mode of preparation, the secondary amines can also contain, inter alia, proportions of corresponding primary amines, but the proportion of these should not exceed 20 percent by weight of the secondary amine. The ratio by weight of the components ($a_3$) and ($a_4$) can be between 1:10 and 1:0.1, preferably between 1:2 and 2:1.

Aqueous or alcoholic, such as, for example, butanolic, solutions of formaldehyde or paraformaldehyde or mixtures thereof are used as formaldehyde or compounds which provide formaldehyde ($a_5$).

The Mannich bases (a) are prepared by the customary methods indicated in the literature (see, for example, Houben-Weyl, Methoden der organischen Chemie (Methods of Organic Chemistry), Volume XI/1, page 731 (1957)), preferably by carrying out the reaction at temperatures between 20° and 80° C. The proportions of the starting materials employed depend on the particular properties desired, the molar ratio of the components ($a_1$) and ($a_2$) to the components ($a_3$) and ($a_4$) being preferably 1:0.75 to 1:3.

In general, however, about one mole of secondary amine is employed for each phenolic hydroxyl group. The quantity of ($a_5$) is at least one mole, relative to one mole of secondary amine.

The Mannich bases (a) which are free from epoxide groups are reacted in a quantity of 50 to 90, preferably 60 to 80, percent by weight, with 5 to 50, preferably 10 to 30, percent by weight of epoxide resin—component (b). The reaction of the component (a) with the component (b) is generally carried out at temperatures from 20° to 100° C., preferably 60° to 80° C., if appropriate in the presence of organic solvents, such as, for example, alcohols, glycol ethers and ketones. The reaction product obtained is substantially free from epoxide groups.

The reaction of (a) with (b) to give the reaction product is described in the Patent Applications of German Published Specification No. 2,419,179, German Published Specification No. 2,320,301, German Published Specification No. 2,357,075, German Published Specification No. 2,541,801 and German Published Specification No. 2,554,080.

Suitable epoxide resins (component b) are preferably polyepoxide compounds having 2 to 3 epoxide groups in the molecule, such as, for example, products from the reaction of polyhydric phenols, particularly those of the formula

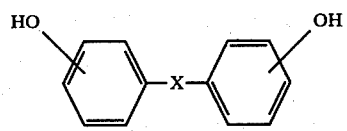

mentioned under ($a_1$), with epichlorohydrin; but also the abovementioned products from the reaction of polyhydric alcohols, such as, for example, pentaerythritol, trimethylolpropane or glycerol, with epichlorohydrin; also products, containing epoxide groups, from the reaction of epoxide resins with secondary amines or glycol ethers containing hydroxyl groups; and also epoxide resins which contain incorporated heteroatoms, such as sulfur.

In general, the epoxide resins (b) also contain aliphatically bonded hydroxyl groups, particularly if a condensation reaction to form higher-molecular products has taken place in the reaction of the polyhydric alcohol.

Some of the aliphatically linked hydroxyl groups from (a) to (b) can, if appropriate, be converted into urethane groups. The reaction of the hydroxyl groups with the partially blocked polyisocyanates can be carried out at any desired stage of the preparation of the binders; it is preferable to react the epoxide resins. This can be effected not only with the epoxide resins constituting the component (b) but also with the epoxide resins (E) which are employed for the preparation of the component ($a_2$). It is also possible to react the finished component ($a_2$) directly with the partially blocked polyisocyanate. If epoxide resins based on polyhydric aliphatic alcohols, for example pentaerythritol, are used, the attack of the isocyanate takes place preferentially at the free primary alcohol group; there is only a secondary reaction at the secondary alcohol group which has been formed from the epoxide ring.

Under the conditions selected, phenolic hydroxyl groups remain in the main unchanged. Any amino or imino groups which may be present can also react with the partially blocked polyisocyanates, which can be desirable in some cases.

The reaction is usually carried out at temperatures from 50° C. to 120° C., preferably from 70° to 100° C., and conventional catalysts for the formation of polyurethanes, such as, for example, dibutyltin dilaurate, can be present. The reaction is carried out in the absence of polar solvents; it is preferable to carry out the reaction in the melt, but inert diluents can also be present.

Aromatic diisocyanates, such as toluylene diisocyanates or xylylene diisocyanates or dimers and trimers thereof, are particularly suitable as partially blocked polyisocyanates. However, it is also possible to use aliphatic diisocyanates, such as hexamethylene diisocyanate, and also prepolymers which are prepared by reacting polyols or polyether polyols with an excess of polyisocyanates. Preferential blocking agents are aliphatic alcohols, which can have straight-chain, branched or cyclic structure, such as, for example, methanol, ethanol, n-, iso- or tert.-butanol, hexanol, ethylhexanol, furfuryl alcohol, cyclohexanol, alkyl-glycols, alkyldiglycols and alkyltriglycols. Other known blocking agents, such as oximes, lactams, ketones or malonic esters, can, however, also be used.

It is possible, without difficulty, to modify only a fraction of the Mannich bases (a) or of the epoxide resins (b) with polyisocyanates, whether this is because epoxide compounds containing or not containing aliphatic hydroxyl groups are present alongside one another or whether further, unmodified epoxide compounds are added after the reaction with polyisocyanate has been carried out.

The proportions in the reaction with the partially blocked polyisocyanates are preferably so chosen that there is 0.01 to 1.0, preferably 0.05 to 0.5, mole of urethane groups to one mole of basic nitrogen in the finished reaction product, counting both the urethane bond between reaction product and polyisocyanate and the urethane bond between blocking agent and polyisocyanate.

The whole structure of the reaction product makes the formation of a metal complex, in particular of a copper complex compound, possible. The preparation of the latter can be carried out in various ways. On the one hand, a solution of a copper salt can be added directly in the last step of the preparation of the reaction product and reacted with the latter. On the other hand, an aqueous solution of a copper salt can also be admixed to the finished reaction product present in solution. The two cases produce a green-colored metal complex compound of the product from the reaction of Mannich bases which are free from epoxide groups with epoxide resins. The absorption bands, measured on a DK2 spectrophotometer from Messrs. Beckmann Instruments, are in the region between 350 nm and 500 nm. They vary within this region as a function of the composition of the Mannich base.

In contrast, starting materials which are required in the preparation of the reaction product do not have absorption bands in the abovementioned region. Di-n-butylamine and di-n-hexylamine do not form complex compounds with copper salts. The solution in water remains colorless and no absorption bands are recorded. For example, diethanolamine produces on the addition of copper salts an intensely violet-colored compound having an absorption at 607 nm.

As a rule those metal salts which are readily accessible and in which the valency of the metals has been chosen in such a manner that the salts are present in their most stable form, for example copper as copper(II) acetate, copper(II) sulfate or copper(II) nitrate, are used in the preparation of the metal complex compounds according to the invention.

If the metal complex compound contains 0.5 to 0.6 part by weight of copper relative to 1,000 parts by weight of the reaction product, then the maximum color intensity is achieved. If lower amounts of copper are used then, in addition to the metal complex, unreacted reaction product is present, but it is also possible that not all groups of the reaction product which are capable of complex formation are complex-bonded to the copper, so that at a lower copper content mixtures of various metal complex compounds are present, the absorption region of which is, however, always between 350 nm and 500 nm. The acid anion of the copper salt is also incorporated simultaneously in order to protonate the metal complex compound.

In its protonated form, the synthetic resin according to the invention in the form of a metal complex compound can be diluted with water. If required, it is possible for additional solvents also to be present, such as, for example, alcohols, such as isopropanol, propanol or butanol, glycols or glycol ethers, such as ethylene glycol, propylene glycol, ethylene glycol monoethyl ether, ethylene glycol monopropyl ether or ethylene glycol monobutyl ether, or other solvents, such as tetrahydrofuran, aliphatic and/or aromatic hydrocarbons, esters, ethers or ether-esters, in order to affect advantageously the dissolving properties and dispersing properties in the coating bath.

The metal complex compounds according to the invention are present in the aqueous coating bath as cationic film formers either on their own or in combination with other synthetic resins which are soluble or dispersible in water and can be deposited cathodically in a mixture with the metal complex compounds. Examples of these synthetic resins are aminoplast condensates, phenoplast condensates, epoxide resins, alkyd resins, polyurethanes or mixtures of these and other synthetic resins. The amount by weight of these additional other synthetic resins should advantageously be in general no larger than the amount by weight of the salts of the cathodically depositable metal complex compounds.

As is customary in other coating agents, the coating bath can similarly contain auxiliaries which can be deposited by electrophoresis, such as, for example, pigments, fillers, hardening catalysts, agents for improving flow, anti-foaming agents, agents for improving adhesion and others.

An aqueous dispersion of the protonated metal complex is preferentially suitable for the cataphoretic deposition of a coating onto an electrically conducting substrate which is connected as the cathode in an electrocoating lacquering process.

For carrying out the cathodic deposition, the aqueous dispersion is diluted with water down to a solids content between 5 and 30%, preferably between 5 and 15%. The pH value is between 7 and 9. During the cathodic deposition, the dispersion is kept at temperatures between 15° and 40° C. The substrate to be coated is immersed in the dispersion and is connected as the cathode. As a rule, graphite or stainless steel is used as the anode. A direct current is passed through the bath between the cathode and the anode. The deposition voltage is between 2 and 400 volts. Under these conditions a coating is deposited on the cathode. Deposition is carried out until the desired film thickness has been achieved.

After the coating is complete, the coated substrate surfaces are removed from the coating bath, advantageously rinsed with deionized water and, to effect hardening, heated for 5 to 180 minutes at temperatures of 80° to 250° C. to be stoved. In this process, increasing the temperature shortens the stoving time. The best results are obtained at stoving temperatures of between 120° and 190° C. and stoving times of between 10 and 40 minutes.

The Examples which follow are intended to illustrate the invention, but not to limit it. Parts relate to parts by weight. Percentages relate to percentages by weight.

EXAMPLE 1

(Comparison Experiment)

984 parts (13.1 moles) of 40% strength formaldehyde solution are added dropwise at 20° to 25° C. to 1,100 parts (4.8 moles) of bisphenol A, 917.5 parts (8.7 moles) of diethanolamine, 332.5 parts (2.5 moles) of di-2-methoxyethylamine and 375 parts of isopropanol. The mixture is stirred for one hour under a nitrogen atmosphere at 30° C. and is then heated at 80° for 3 hours. Isopropanol and water are removed by distillation under a slight vacuum. This gives a yellow, resin-like mass with a solids content of 91%. 70 parts of paraformaldehyde are added to 2,542 parts of the above and the mixture is subjected to a condensation reaction for 9 to 10 hours at 70° C. under a nitrogen atmosphere. A Mannich base (component a) is obtained in the form of a viscous mass having a solids content of 90%.

544 parts of this Mannich base are reacted for 3 hours at 60° C. with 136.5 parts of a commercially available reaction product formed from bisphenol A and epichlorohydrin (epoxide value: 0.2) (epoxide resin epoxy 1/33 manufactured by Chemapol) and 54.5 parts of a commercially available reaction product formed from pentaerythritol and epichlorohydrin (epoxide value: 0.57) (Epoxin 162, BASF AG), using 34 parts of dimethyl glycol ether.

This is a clear, viscous resin having an average molecular weight of 860 and a residual formaldehyde content of 0.3%. The solids content is 70%. The resin does not exhibit an absorption when measured in a DK2 photometer (Messrs. Beckmann Instruments).

EXAMPLE 2

Example 1 is repeated with the difference that 544 parts of the Mannich base are reacted for 3 hours at 60° C. with 136.5 parts of a commercially available reaction product formed from bisphenol A and epichlorohydrin and 1 part of an aqueous solution of copper(II) acetate, which contains 0.4 part of Cu ions, using 33 parts of dimethyl glycol ether.

The resin obtained has a green color. The solids content is 70%. When measured in a DK2 photometer, it exhibits an absorption band at 375 nm.

EXAMPLE 3

Example 1 is repeated with the difference that 1 part of an aqueous solution of copper(II) acetate, which contains 0.3 part of Cu ions, is admixed, still with very vigorous stirring, to the finished resin solution of 70% solids content.

A resin solution is obtained which has a green color. When measured in a DK2 photometer, it exhibits an absorption band at 378 nm.

EXAMPLE 4

533 parts (4.25 moles) of a 24% strength formaldehyde solution in isobutanol are added dropwise, at 20° to 25° C. and under a protective nitrogen atmosphere, to 375.0 parts (1.65 moles) of bisphenol A, 260.0 parts (2.48 moles) of diethanolamine, 215.0 parts (1.67 moles) of di-n-butylamine and 200 parts of isopropanol. The batch is stirred for 30 minutes at 30° C. and is then heated at 80° C. for 3 hours. 150.0 parts of a commercially available reaction product formed from pentaerythritol and epichlorohydrin (epoxide value: 0.57) and 375 parts of a commercially available reaction product formed from bisphenol A and epichlorhydrin (epoxide value: 0.2), which together correspond to 1.61 mole equivalents of epoxide groups, and then added, the batch is maintained at 70° C. for 5 hours, and 170.0 parts of a condensation product formed from acetylenediurea and formaldehyde and 1 part of an aqueous solution of copper(II) sulfate, which contains 0.62 part of Cu metal, are then added with stirring. A clear greenish resin which has a solids content of 67.3% is obtained. Its average molecular weight is 1,000 to 1,300. When measured in a DK2 photometer, it exhibits an absorption band at 405 nm.

EXAMPLE 5

4 coating baths are prepared which differ only in that instead of the resin obtained according to Example 1, resins of Examples 2, 3 or 4 are used.

To prepare the coating baths, 385 parts by weight of the resin in accordance with Example 1 (batch a) or of Example 2 (batch b) or of Example 3 (batch c) or of Example 4 (batch d) are neutralized with 2 percent by weight of glacial acetic acid, relative to the solids content of the resin. 221 parts by weight of a pigment paste are then added which paste has been homogenized in a three-roll mill and is composed of 366 parts by weight of one of the resins in accordance with Example 1, 2, 3 or 4, 174 parts by weight of talcum powder, 45 parts by weight of carbon black, 90 parts by weight of aliphatic fatty alcohols having 10 to 14 C atoms and 325 parts by weight of isopropanol, wherein the paste is mixed with the resin in accordance with Example 1 to give batch a, with the resin in accordance with Example 2 to give batch b, with the resin in accordance with Example 3 to give batch c and with the resin in accordance with Example 4 to give batch d.

The mixtures are diluted with deionized water down to a solids content of 12 percent by weight and stirred for 48 hours at 30° C. prior to the start of the deposition. The pH value of the diluted coating bath is 7.9. Each coating bath is divided into 2 parts.

A degreased sheet of steel (a) is immersed in one part as the cathode and a zinc phosphatized sheet of steel (b) is immersed in the other part as the cathode.

The two coating baths are then further processed in an identical manner:

After the cathodes have been immersed, a coating is deposited for 2 minutes at a direct voltage of 220 volts. During the deposition the coating bath is maintained at a temperature of 30° C. The coated cathodes are then removed from the coating bath, rinsed with deionized water and blown off with air. The sheets are then stoved for 20 minutes at 190° C. The stoved coating on the degreased sheet of steel (a) has a film thickness of 26 μm; the stoved coating on the zinc phosphatized sheet has a film thickness of 16 μm. The zinc phosphatized sheet of steel had a zinc phosphate layer of approx. 2 g/m$^2$.

The corrosion protection values of the coatings obtained according to a and b are indicated in the table below.

| | Subcoating rust development in mm in accordance with ASTM-B-117-64 | |
| --- | --- | --- |
| | degreased sheet of steel (a) | zinc phosphatized sheet of steel (b) |
| Batch | 96 hours / 168 hours | 240 hours |
| a (comparison batch) | >10    >15 | 1.5 |
| b | 1.0    1.5 | 0.5 |
| c | 0.5    1.5 | 0.5 |
| d | 1.5    2 | 0.5 |

We claim:

1. A synthetic resin in the form of a metal complex compound comprising a reaction product of:
(a) Mannich bases which are free from epoxide groups; with
(b) epoxide resins; wherein aliphatic hydroxy groups originating from (a), (b), or a mixture thereof are at least partially converted into urethane groups by reaction with partially blocked isocyanate, said Mannich base (a) formed from components selected from:
($a_1$) condensed phenols which are free from ether groups and contain at least two aromatic rings and at least two phenolic hydroxyl groups;
($a_2$) condensed phenols which contain other groups and contain at least two aromatic rings and at least two phenolic hydroxyl groups;
($a_5$) formaldehyde or compounds which split off formaldehyde;
($a_3$) secondary amines having at least two hydroxyalkyl group; and
($a_4$) dialkylamines or dialkoxyalkylamines which do not contain free hydroxyl groups; or from the components:
($a_1$) and ($a_2$) with ($a_5$) and ($a_3$);
($a_1$) with ($a_5$) and ($a_3$);
($a_2$) with ($a_5$) and ($a_3$);
($a_1$) with ($a_5$), ($a_3$), and ($a_4$); or
($a_2$) with ($a_5$), ($a_3$), and ($a_4$); and copper complex bound with said reaction product to form said metal complex compound.

2. The synthetic resin of claim 1, wherein 0.5 to 0.6 part by weight of said copper are bonded to each 1,000 parts by weight of said reaction product.

3. The synthetic resin of claim 2, wherein said reaction product is protonated by acids.

4. The synthetic resin of claim 1 having an absorption band between 350 and 500 nm.

5. A process for the preparation of the synthetic resin in accordance with claim 1, which comprises reacting a copper salt solution with a solution of said reaction product.

6. Stoved coatings on the surface of electrically conductive substrates prepared by connecting said substrates as the cathode in a coating bath comprising said metal complex compound of claim 3, carrying out a cathodic electrocoating lacquering process and stoving the electrodeposited coatings resulting therefrom.

7. The synthetic resin of claim 1, wherein said Mannich bases are formed from components ($a_1$) with ($a_5$) and ($a_3$).

8. The synthetic resin of claim 1, wherein said Mannich bases are formed from components ($a_2$) with ($a_5$) and ($a_3$).

9. The synthetic resin of claim 1, wherein said Mannich bases are formed from components ($a_1$) and ($a_2$) with ($a_5$) and ($a_3$).

10. The synthetic resin of claim 1, wherein said Mannich bases are formed from components ($a_1$) and ($a_2$) with ($a_5$), ($a_3$), and ($a_4$).

11. The synthetic resin of claim 1, wherein said Mannich bases are formed from components ($a_1$) with ($a_5$), ($a_3$), and ($a_4$).

12. The synthetic resin of claim 1, wherein said Mannich bases are formed from components ($a_2$) with ($a_5$), ($a_3$), and ($a_4$).

13. The synthetic resin of claim 1, wherein said copper complex is bound with a salt selected from the group consisting of copper (II) acetate, copper (II) sulfate, and copper (II) nitrate.

14. The synthetic resin of claim 13, wherein said metal complex compound is formed by reacting component (a) with component (b) in the presence of said copper salt.

15. The synthetic resin of claim 13, wherein said metal complex compound is formed by reacting the reaction product of components (a) and (b) with said copper salt.

16. A synthetic resin in the form of a metal complex compound which is substantially free from epoxide groups and is obtained by reacting
(a) mannich bases of
($a_1$) at least one condensed phenol which is free from ether groups and contains at least two aromatic rings and at least two phenolic hydroxyl groups per molecule,
($a_2$) at least one condensed phenol containing at least one ether group per molecule and also at least two aromatic rings and at least one phenolic hydroxyl group per molecule,
($a_3$) at least one secondary amine containing at least one hydroxyalkyl group or a mixture of one such secondary amine with at least one secondary dialkyl amine or dialkoxyalkyl amine which do not contain free hydroxyl groups,
($a_4$) formaldehyde or a formaldehyde-forming compound, with
(b) at least one epoxide resin
in which reaction product copper being complex-bonded by reacting component (a) with component (b) in the presence of a copper salt or by reacting the reaction product of (a) and (b) with said copper salt, the copper complex compound having 0.5 to 0.6 part by weight of copper bonded to each 1,000 parts by weight of the reaction product of (a) and (b).

17. The synthetic resin of claim 16, wherein the reaction product of (a) and (b) contains urethane groups, which have been obtained by reacting a partially blocked isocyanate with the mannich bases (a) or the epoxide resins (b) or the reaction product of (a) and (b).

18. The synthetic resin of claim 16, obtained by reacting mannich bases (a) which have been obtained from $a_1$ or $a_2$ with $a_3$ and $a_4$.

19. The synthetic resin of claim 1, obtained by reacting mannich bases (a) which have been obtained under the following conditions:
the ratio of components $a_1$ to $a_2$ is from 1:0.1 to 1:5 by weight; the ratio of components $a_3$ to $a_4$ is from 1:10 to 1:0.1 by weight; the ratio of moles $a_1 + a_2$ to $a_3 + a_4$ is from 1:0.75 to 1:3 by weight and at least one mole of component $a_5$ is used for one mole of $a_3 + a_4$.

20. The synthetic resin of claim 16, wherein from 50 to 90 percent by weight of component (a) is reacted with from 10 to 50 percent by weight of component (b).

21. The synthetic resin of claim 16, protonized with inorganic acids or water-soluble organic acids or mixtures thereof.

* * * * *